United States Patent
Andrews et al.

[11] 3,795,834
[45] Mar. 5, 1974

[54] OSCILLOSCOPE HAVING EXTERNAL TRIGGER DISPLAY MODE

[75] Inventors: Roland Eugene Andrews, Portland; Robert Edward White, Aloha, both of Oreg.

[73] Assignee: Tektronix, Inc., Beaverton, Oreg.

[22] Filed: July 5, 1972

[21] Appl. No.: 269,006

[52] U.S. Cl. ............................................. 315/26
[51] Int. Cl. ............................................ H01j 29/70
[58] Field of Search ............ 328/181; 315/26, 27 R; 178/7.55

[56] References Cited
UNITED STATES PATENTS

| | | | |
|---|---|---|---|
| 3,599,034 | 8/1971 | Fischer | 315/26 |
| 3,559,082 | 1/1971 | Horn | 328/181 |

*Primary Examiner*—Maynard R. Wilbur
*Assistant Examiner*—J. M. Potenza
*Attorney, Agent, or Firm*—Adrian J. La Rue

[57] ABSTRACT

An oscilloscope has an additional vertical display mode to enable the display of an external triggering signal while it is activating the sweep-generating circuit. Triggering source, level, slope, and timing can be verified or examined without reconnection of signal cables or disturbing front-panel controls. When switching between vertical display modes, the displayed external triggering signal is in precise time relationship with signals displayed through normal vertical channels.

9 Claims, 4 Drawing Figures

3,795,834

OSCILLOSCOPE HAVING EXTERNAL TRIGGER DISPLAY MODE

BACKGROUND OF THE INVENTION

Conventional triggerable oscilloscopes generally have at least three sweep triggering modes: internal, line, and external. In the internal triggering mode, a signal for display is applied to the vertical input terminal. A sample of the display signal is derived from the vertical preamplifier and routed internally to the trigger-generating circuit. A sweep is initiated when the display signal passes through a pre-selected reference level. Since the sweep generator has an inherent time delay from the time a trigger is produced until the time the display actually starts on the cathode-ray tube screen, the display signal is deliberately delayed to allow leading-edge portion of a rapid changing waveform to be seen.

In the line-triggering mode, a repetitive sweep is synchronized with the power-line frequency, whether a vertical display signal is available or not. A sample of the power-line A. C. voltage is derived from the power input circuit and routed internally to the trigger-generating circuit. There is generally no need to view the triggering signal in this mode because of its known frequency, shape, and stability. For this mode to be useful, the vertical display signal must be time-related to the line frequency.

In the external triggering mode, the triggering signal is applied from an external source, such as a signal generator or a reference point in a circuit under test, directly to the trigger-generating circuit via an external trigger input terminal. A sweep is initiated when the triggering signal passes through a pre-selected reference level. This mode is useful when the vertical display signal must be observed in its relationship to another event.

Sometimes it is necessary to verify the external triggering source, or check the triggering level or slope, etc., by examining the triggering waveform. Previously, this required that the vertical display signal be disconnected from the vertical input terminal, then the external triggering signal moved from the external triggering input terminal to the vertical input terminal. Then the triggering source and level controls, the vertical deflection sensitivity, vertical position, and attenuator controls required readjusting with little assurance that triggering could be achieved at the proper point on the waveform. After the check was completed, all the signal cables and controls had to be returned to the initial conditions. Consequently, the operation was complicated, time consuming, inconvenient, and subject to error.

SUMMARY OF THE INVENTION

According to the present invention, an additional vertical display mode has been added to a conventional oscilloscope to permit observation of an external triggering signal by simply actuating a switch. Additionally, the exact point on the triggering signal waveform at which the sweep is initiated can be precisely located. A trigger-view preamplifier circuit comprising a balanced differential amplifier receives both the external triggering signal and the triggering level reference voltage from a portion of the trigger input circuit. The push-pull output of the trigger-view preamplifier circuit is switched into the vertical-channel delay line, processed by the vertical output amplifier, and applied to the vertical deflection plates of the cathode-ray tube (CRT). Overall delay of the trigger-view preamplifier is matched to the overall delay of the normal vertical preamplifier stage, allowing the leading edge of a rapidly changing external triggering waveform to be observed as is the case previously described for conventional internally-triggered displays. Also, since the trigger-view preamplifier is a balanced differential amplifier, vertical screen center corresponds to the level set by the triggering level control. Thus the oscilloscope operator can achieve stable triggering on a desired point on the external triggering signal because he can see the triggering level in relation to the triggering waveform.

It is therefore one object of the present invention to provide an oscilloscope display of an external triggering signal waveform while it is triggering the time-base sweep without changing signal connections or disturbing any controls of the oscilloscope.

It is another object of the present invention to provide a simple means for precisely locating the point on the triggering waveform at which a time-base sweep is initiated.

It is still yet another object of the present invention to provide a simple means for identifying or verifying an external triggering source.

It is a further object of the present invention to provide an oscilloscope display of an external triggering signal in the precise time-position relationship to a signal applied to the normal vertical amplifier channel.

Other objects and attainments of the present invention will become apparent to those skilled in the art upon a reading of the following detailed description when taken in conjunction with the drawings in which there is shown and described a block diagram and an illustrative embodiment of the invention; it is to be understood, however, that this embodiment is not intended to be exhaustive nor limiting of the invention but is given for purposes of illustration in order that others skilled in the art may fully understand the invention and principles thereof and the manner of applying it in practical use so that they modify it in various forms, each as may be best suited to the conditions of the particular use.

DRAWINGS

FIG. 1 shows a simplified block diagram of an oscilloscope in which the relationship of the present invention to the conventional circuits is shown, FIG. 2 shows a schematic of the preferred embodiment according to the present invention, FIG. 3 shows a waveform ladder diagram of important waveforms according to the present invention, and FIG. 4 shows identical waveforms displayed on a cathode-ray tube screen in (A) normal vertical mode and (B) external trigger display mode.

DETAILED DESCRIPTION

Figure 1:
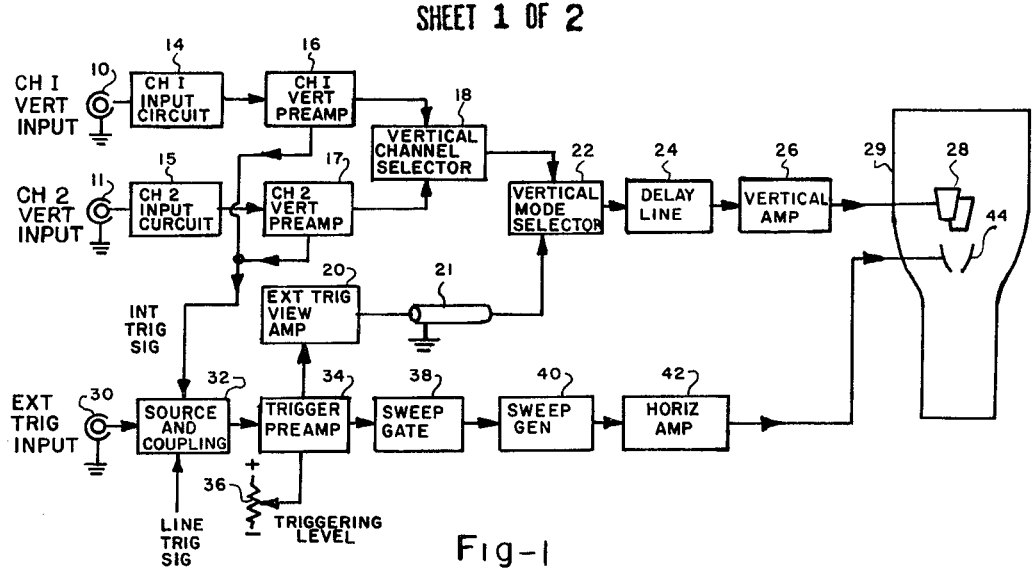

Referring to FIG. 1, the block diagram of a largely conventional oscilloscope having two vertical amplifier channels is shown. A signal to be displayed on the cathode-ray tube screen is applied to either channel 1 or channel 2 input terminal 10 or 11. Input circuit 14 or 15 provides correct attenuation and coupling, then the signal receives its first amplification and is split into a push-pull, or differential output by preamplifier 16 or 17. Preamplifiers 16 and 17 generally include gain switching to provide a plurality of vertical deflection factors, and they also generally provide a sample of the display signal to the time-base triggering circuit. The channel to be viewed is selected by vertical channel selector 18, then the signal is routed via the closed contacts of vertical mode selector 22 (to be discussed later) to the delay line 24. Delay line 24 is designed to deliberately delay the display vertical information to allow the internal triggering signal to activate the sweep generator circuits, thus ensuring no loss of the display information. The signal receives a final amplification by vertical amplifier 26 and is then applied to vertical deflection plates 28 of the cathode-ray tube 29. The triggering source and coupling switches 32 select a suitable triggering signal from internal, line, or external sources and provide the desired coupling of the triggering signal to the trigger preamplifier 34. Generally, trigger preamplifier 34 is a comparison amplifier, comparing the triggering signal to a reference voltage established by potentiometer 36, and producing a trigger when the triggering signal voltage passes through the reference level. Upon receipt of a trigger, sweep gate 38 produces a voltage which turns on sweep generator 40, producing a sawtooth voltage which is split into a differential signal and amplified by horizontal amplifier 42 to levels suitable to drive horizontal deflection plates 44 in a linear fashion. In most conventional oscilloscopes, sweep gate 38 is a bistable multivibrator, and sweep generator 40 is a Miller integrator.

The novelty of the present invention is the addition of a vertical display mode to permit viewing an external triggering signal while such a signal is activating the sweep circuits. A triggering signal applied from an external source to input terminal 30 is selected by the triggering source and coupling switches 32, and applied to the input of the trigger preamplifier in the conventional fashion. However, the triggering signal, together with the reference level from potentiometer 36, is also routed to external trigger-view preamplifier 20. The output from preamplifier 20 is passed through coaxial cables 21 to the vertical mode selector 22. Vertical mode selector 22 selects the display signal from either the normal vertical preamplifier channel or the trigger-view preamplifier.

Figure 2:
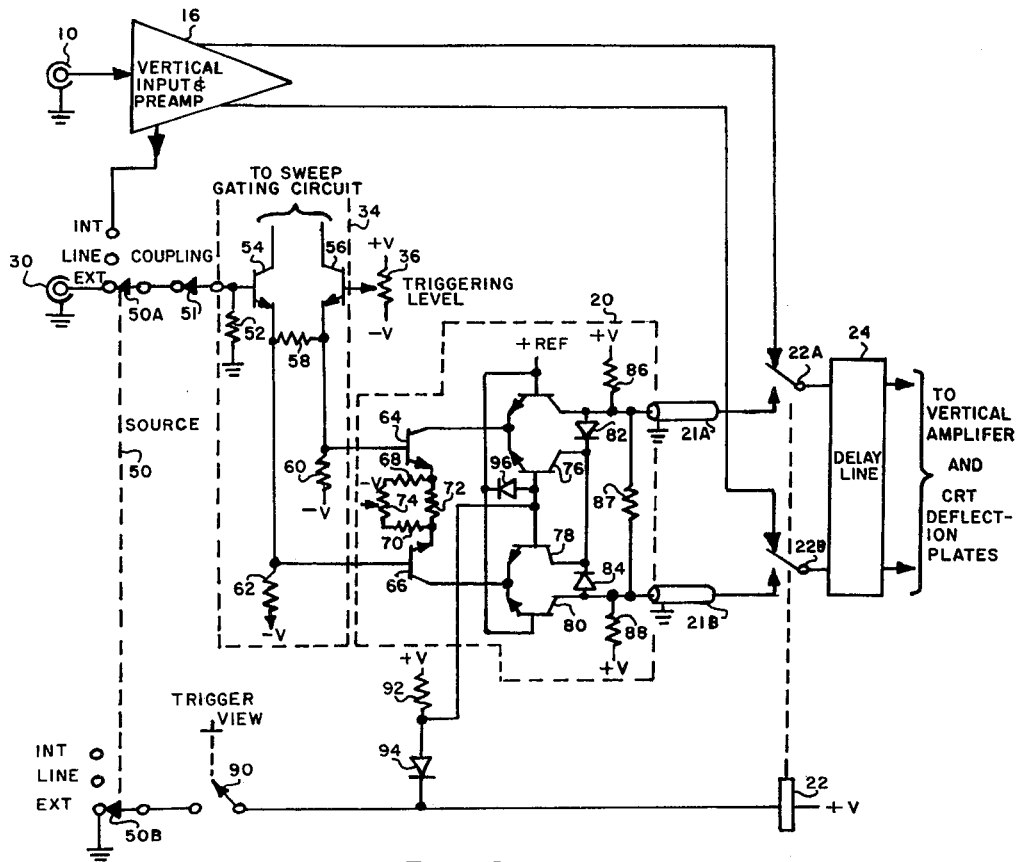
Figures 3, 4:
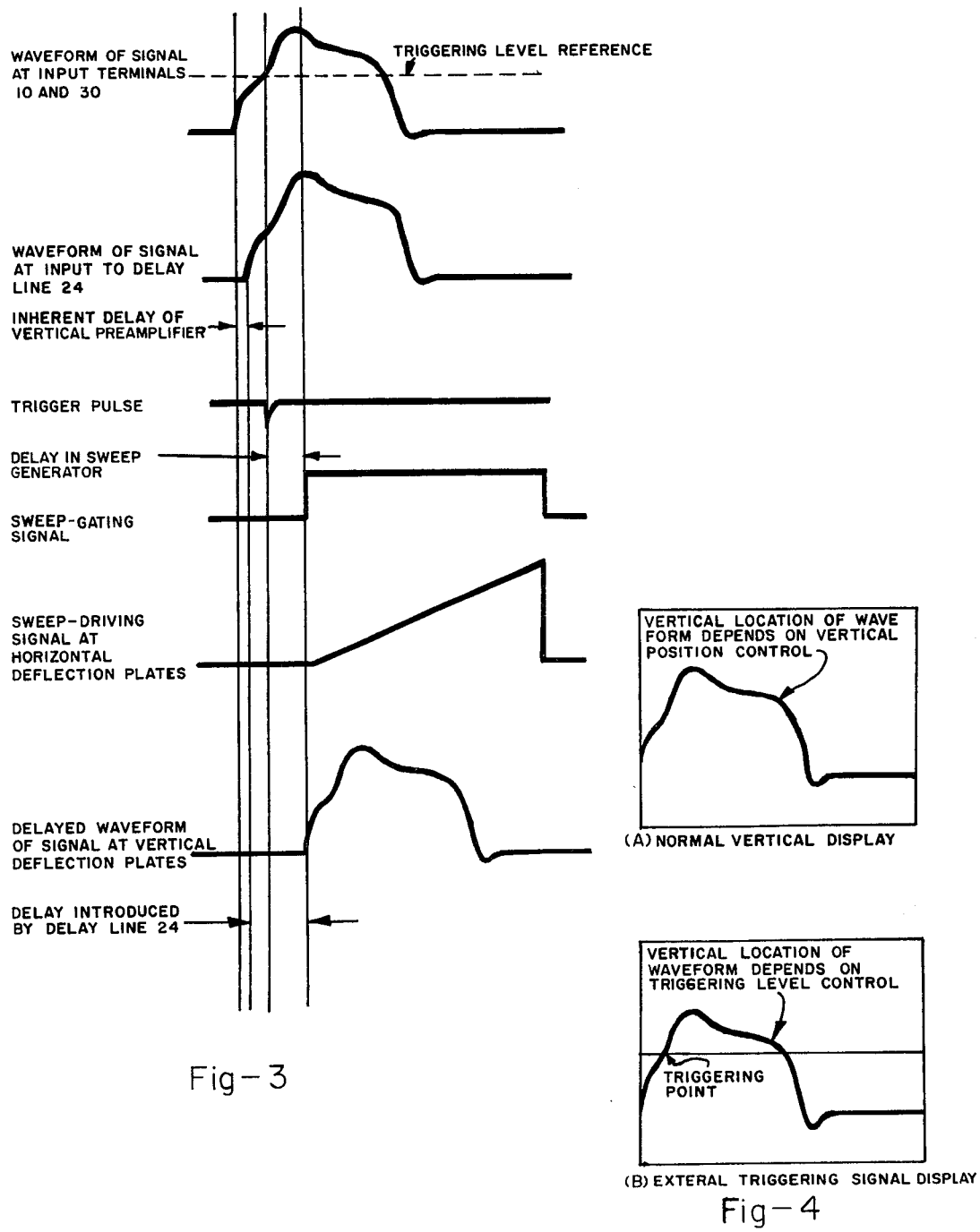

FIG. 2 shows a schematic of the preferred embodiment according to the present invention. As described previously, a display signal applied to input terminal 10 is preamplified and split into a push-pull signal by vertical preamplifier 16. The push-pull output is applied via switch contacts 22A and 22B to delay line 24. For clarity in comparing time relationship and displays, assume that an identical signal is applied to the external triggering input terminal 30; in normal practice, these signals would usually be different or at least not coincident. The waveforms shown in FIG. 3, therefore, apply to both modes of operation, while FIG. 4 shows the displays of these waveforms. For this discussion, the triggering source switch 50 is in the EXT position as shown. The triggering signal passes through switch contacts 50A and through the closed contacts of the coupling switch 51 to the input of a trigger preamplifier circuit 34. Trigger preamplifier 34 includes transistors 54 and 56, which are emitter coupled through resistor 58 to form a comparison amplifier. Resistors 52–62 and 36–60 establish biasing conditions for transistors 54 and 56 respectively. The triggering signal at the base of transistor 54 is compared to a voltage level between +V and −V set at the base of transistor 56 by potentiometer 36, establishing the point on the triggering waveform at which it is desired to initiate a sweep signal. The triggering signal and triggering level reference voltage are transmitted via the base-emitter paths of transistors 54 and 56 respectively to the two inputs of a trigger-view preamplifier 20. While the preferred embodiment shows these signals routed through a portion of the trigger preamplifier circuit 34, an alternative embodiment could employ separate emitter followers for this function.

Thus the external triggering signal and the triggering level reference voltage are applied to the two input terminals of a trigger-view preamplifier 20, which is a balanced differential amplifier. This circuit 20 includes a pair of emitter-coupled transistors 64 and 66, whose base input is developed across the coupling resistor 58. The emitters of transistors 64 and 66 are coupled together through a parallel combination of resistors 68, 70, 72, and 74, across which the triggering signal is developed. The emitters of transistors 64 and 66 are returned to the negative voltage supply −V through bias resistors 68 and 70. Resistor 74 provides an adjustment to balance the two halves of the amplifier, and hence the two vertical deflection plates, when the voltage potentials at the bases of transistors 64 and 66 are equal. Thus, it can be seen that the displayed trigger level reference is established at CRT screen center, for the bases of transistors 64 and 66 are equal at the triggering point on the waveform.

Two sets of emitter-coupled transistor pairs 74–76 and 78–80, which are NPN transistors in this embodiment, are connected to the collectors of the transistors 64 and 66 respectively. The bases of transistors 74 and 80 are connected together to a suitable positive reference voltage +REF, and the bases of transistors 76 and 78 are connected together through a bias resistor 92 to a suitable voltage source +V higher than +REF in the mode shown (switch 90 open). Therefore, for conventional oscilloscope operation, that is, when it is not desired to view the external triggering signal, the collector currents of transistors 64 and 66 flow through conducting transistors 76 and 78 and are summed at the collectors of transistors 76 and 78. Then the current is divided in half, and the half amount flows through each diode 82 and 84 and collector-load resistors 86 and 88, maintaining a no-signal DC balance at the trigger-view preamplifier 20 output.

To view the external triggering signal, the contacts of switch 90 are closed, grounding the cathode of diode 94 and one side of relay 22. With conduction of diode 94, the bases of transistors 76 and 78 are one diode junction above ground and the bases of resistors 74 and 80 are at a higher potential, +REF. Therefore, transistors 76 and 78 turn off and transistors 74 and 80 turn on. Simultaneously, relay 22 energizes, switching the delay line input from the vertical preamplifier 16 output to the trigger-view preamplifier 20 output. The triggering signal developed across emitter resistor 72 is then amplified and a push-pull output is developed across the collector-load resistors 86, 87, and 88. The push-pull output is then passed through coaxial cables 21A and 22B, the switch contacts 22A and 22B, and into the vertical output amplifier channel for display on the CRT screen. As mentioned previously, coaxial cables 21A and 21B provide the required delay match to that of vertical amplifier 16. Thus, as can be seen in FIGS. 3 and 4, if identical signals are applied to input terminals 10 and 30, no horizontal shift of the waveform will be observed when switching the vertical mode switch 22 between the normal vertical display mode and the external trigger display mode. Furthermore, in the external trigger display mode, the exact triggering point on the external triggering signal waveform can be located at the point where the waveform crosses the center horizontal line of the graticule scale. Of course, triggering slope can also be determined from observation of the slope of the waveform at the triggering point.

The foregoing preferred embodiment comprises integrated circuits for high-frequency, low-power operation, however, it should be pointed out that the basic circuit could be fabricated of discrete transistors of either NPN or PNP type, and that switching means other than a relay could be employed without departing from the scope and spirit of the present invention.

It will, therefore, be appreciated that the aforementioned and other desirable objects have been achieved; however, it should be noted that the particular embodiment of the invention, which is shown and described herein, is intended as merely illustrative and not as restrictive of the invention.

We claim:

1. In an oscillographic instrument for providing a display of electrical signals; said instrument including vertical deflection means for generating a first vertical deflection signal in accordance with the instantaneous amplitude of a first electrical input signal for determining the amplitude of a waveform thereof; said instrument also including horizontal deflection means for generating a horizontal deflection signal for providing a time-base sweep signal, said sweep signal being generated in response to the output of a trigger comparator means whose inputs are a selective second electrical input signal and a selective reference voltage, wherein said second electrical signal is compared to said selective reference voltage; the improvement comprising:

means for receiving said second electrical and said selective reference voltage from said trigger comparator means and generating a second vertical deflection signal in response thereto, said second vertical deflection signal being generated in accordance with the amplitude of said second electrical signal and in comparison to said reference voltage for determining the sweep-initiating point on the displayed waveform thereof; and means for selectively providing a display of said first vertical deflection signal or said second vertical deflection signal.

2. An oscillographic instrument for providing a display of electrical signals, said instrument comprising:

first vertical amplifier means for generating a first vertical deflection signal in accordance with the amplitude of a first electrical input signal for determining the amplitude of the waveform thereof;

horizontal deflection means generating a horizontal deflection signal for providing a time-base sweep signal, said horizontal deflection means including a trigger generator portion thereof for producing a trigger signal to initiate said time-base sweep signal, said trigger generator comparing the substantially varying voltage of said second electrical signal to a selective reference voltage therein and said trigger signal being produced when the instantaneous voltage of said second electrical signal is equal to said reference voltage;

second vertical amplifier means for receiving said second electrical signal and said selective reference voltage from said trigger generator and generating a second vertical deflection in response thereto; and vertical deflection means including switching means for selectively providing a display of either or both of said first vertical deflection and said second vertical deflection signal.

3. The oscillographic instrument according to claim 2 wherein said second vertical amplifier means comprises a balanced differential amplifier receiving respectively at a pair of input terminals therein said second electrical signal and said reference voltage thereby producing said second vertical deflection signal differentially at a pair of output terminals therein.

4. The oscillographic instrument according to claim 3 wherein said second vertical amplifier means also includes delay means for providing substantially matched time delay between said first and second vertical amplifier means.

5. The method of displaying an auxiliary electrical signal by an oscillographic instrument including a first vertical deflection means generating a first vertical deflection signal in accordance with the instantaneous amplitude of a primary electrical input signal and including horizontal deflection means generating a horizontal deflection signal in response to the comparison of said auxiliary electrical signal to a selective reference voltage in a trigger generator portion thereof, said method comprising:

applying said auxiliary electrical signal to a first input terminal of a second vertical deflection means while applying said reference voltage to a second input terminal of said second vertical deflection means, generating a second vertical deflection signal in accordance with the instantaneous amplitude of said auxiliary signal and the level of said reference voltage, delaying said second vertical deflection signal to provide a time match with said first vertical deflection signal, and selectively displaying said first vertical deflection signal and/or said second vertical deflection signal.

6. The method according to claim 5 wherein said auxiliary signal is an external triggering signal.

7. An oscilloscope having means to provide a display of an external triggering signal while said signal is activating a sweep generator portion thereof, said means comprising:

trigger-view amplifier means receiving an input from a trigger generator portion of said oscilloscope, said input including said external triggering signal and a triggering level reference voltage, and switching means selecting a display signal from normal vertical amplifier channel means and/or said trigger-view amplifier means.

8. The oscilloscope according to claim 7 wherein said trigger-view amplifier means is a balanced differential amplifier including delaying means to provide a time match between signals processed by said trigger-view amplifier means and a normal vertical amplifier means of said oscilloscope.

9. The oscilloscope according to claim 7 wherein said display of said external triggering signal includes triggering level and triggering slope information such that the sweep-initiating point is determinable from the waveform thereof.

* * * * *